US012694764B2

(12) United States Patent　　　　(10) Patent No.:　US 12,694,764 B2
Kumar Agrawal et al.　　　　　　　(45) Date of Patent:　　　Jul. 28, 2026

(54) ELECTRONIC DEVICES, SYSTEMS, AND CORRESPONDING METHODS FOR MANAGING ALARMS ACROSS CONNECTED DEVICES

(71) Applicant: Motorola Mobility LLC, Chicago, IL (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/932,438

(22) Filed: Oct. 30, 2024

(65) Prior Publication Data

US 2026/0120546 A1　　Apr. 30, 2026

(51) Int. Cl.
　　*G08B 25/08*　　　(2006.01)
　　*G06F 21/44*　　　(2013.01)
　　*G08B 3/10*　　　(2006.01)
(52) U.S. Cl.
　　CPC ............... *G08B 3/10* (2013.01); *G06F 21/44* (2013.01)
(58) Field of Classification Search
　　CPC .......... G08B 3/10; G06F 21/44; G16H 40/67; G16H 10/60; G16H 50/30; G16H 40/20; G16Z 99/00
　　USPC ................ 340/692, 691.1, 693.5, 573.1, 575
　　See application file for complete search history.

(56) References Cited

U.S. PATENT DOCUMENTS

| | | | | |
|---|---|---|---|---|
| 10,832,818 B2 * | 11/2020 | Muhsin | .................. | G16Z 99/00 |
| 2011/0294541 A1 * | 12/2011 | Zheng | .................... | G08B 21/24 |
| | | | | 340/384.1 |
| 2012/0112903 A1 * | 5/2012 | Kaib | .................... | A61B 5/0022 |
| | | | | 340/539.12 |
| 2014/0269224 A1 * | 9/2014 | Huh | ..................... | A61B 5/4806 |
| | | | | 368/73 |
| 2019/0019399 A1 * | 1/2019 | Landwehr | .............. | G16H 40/20 |

OTHER PUBLICATIONS

"Clocky Alarm Clock on Wheels, Coco", Available as early as Jan. 27, 2024 on Amazon at https://www.amazon.in/CLOCKY-Alarm-Clock-Wheels-Pink/dp/B0011E4Q4U?th=1.
"I Can't Wake Up! Alarm Clock App", Available on Google Play; Last Updated Jul. 7, 2023; https://play.google.com/store/apps/details?id=com.kog.alarmclock&hl=en_US.

* cited by examiner

*Primary Examiner* — Anh V La
(74) *Attorney, Agent, or Firm* — Philip H. Burrus, IV

(57)　　　　　ABSTRACT

A system manages alarms across connected electronic devices by detecting companion devices within an environment and determining their relative locations to an authorized user. The system actuates an alarm on the device closest to the user. If no user input is detected, the system shifts the alarm to the next closest device. This dynamic alarm management ensures user engagement by leveraging spatial arrangements of devices, thereby reducing the risk of oversleeping. The system includes various electronic devices such as smartphones, smartwatches, and Internet of Things devices, and can operate in a daisy-chain mode or simultaneously across multiple devices.

20 Claims, 6 Drawing Sheets

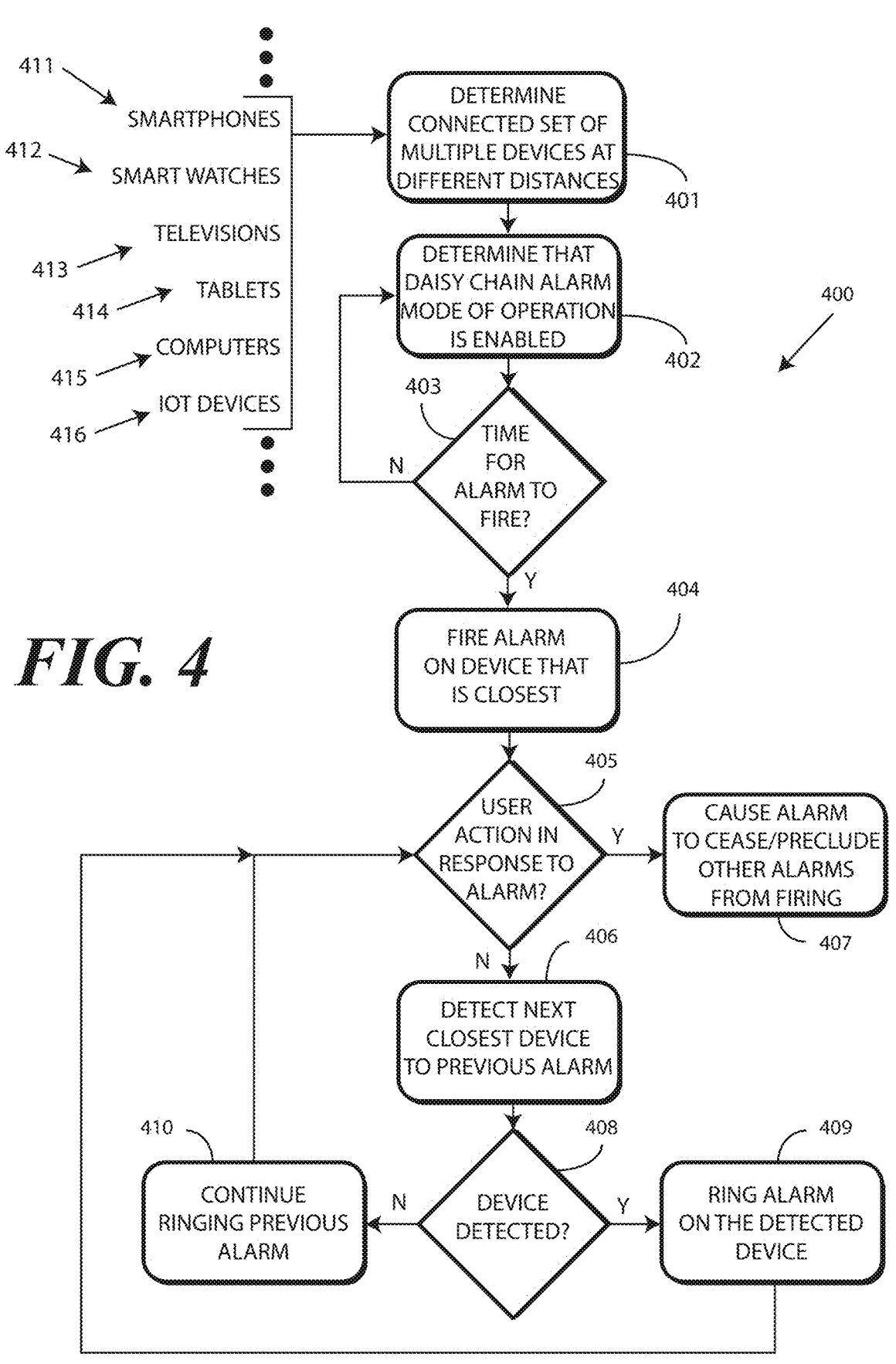

*FIG. 4*

411 → SMARTPHONES

412 → SMART WATCHES

TELEVISIONS

413 → TABLETS

414 →

415 → COMPUTERS

416 → IOT DEVICES

DETERMINE CONNECTED SET OF MULTIPLE DEVICES AT DIFFERENT DISTANCES 401

DETERMINE THAT DAISY CHAIN ALARM MODE OF OPERATION IS ENABLED 402

400

403 TIME FOR ALARM TO FIRE? N Y

FIRE ALARM ON DEVICE THAT IS CLOSEST 404

405 USER ACTION IN RESPONSE TO ALARM? Y N

CAUSE ALARM TO CEASE/PRECLUDE OTHER ALARMS FROM FIRING 407

DETECT NEXT CLOSEST DEVICE TO PREVIOUS ALARM 406

410 CONTINUE RINGING PREVIOUS ALARM

408 DEVICE DETECTED? N Y

RING ALARM ON THE DETECTED DEVICE 409

ELECTRONIC DEVICES, SYSTEMS, AND CORRESPONDING METHODS FOR MANAGING ALARMS ACROSS CONNECTED DEVICES

BACKGROUND

Technical Field

This disclosure relates generally to electronic devices, and more particularly to electronic devices having alarms.

Background Art

Traditional alarm clocks have largely been replaced by modern electronic communication devices, which offer users the ability to set alarms conveniently on personal platforms. This functionality assists individuals in managing their schedules and maintaining punctuality in daily routines. Despite these technological advancements, challenges such as oversleeping persist due to factors like fatigue and irregular sleep patterns. This ongoing struggle highlights the need for a more effective solution to ensure timely wakefulness and adherence to commitments.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 4 illustrates one explanatory method in accordance with one or more embodiments of the disclosure.

Figure 1:
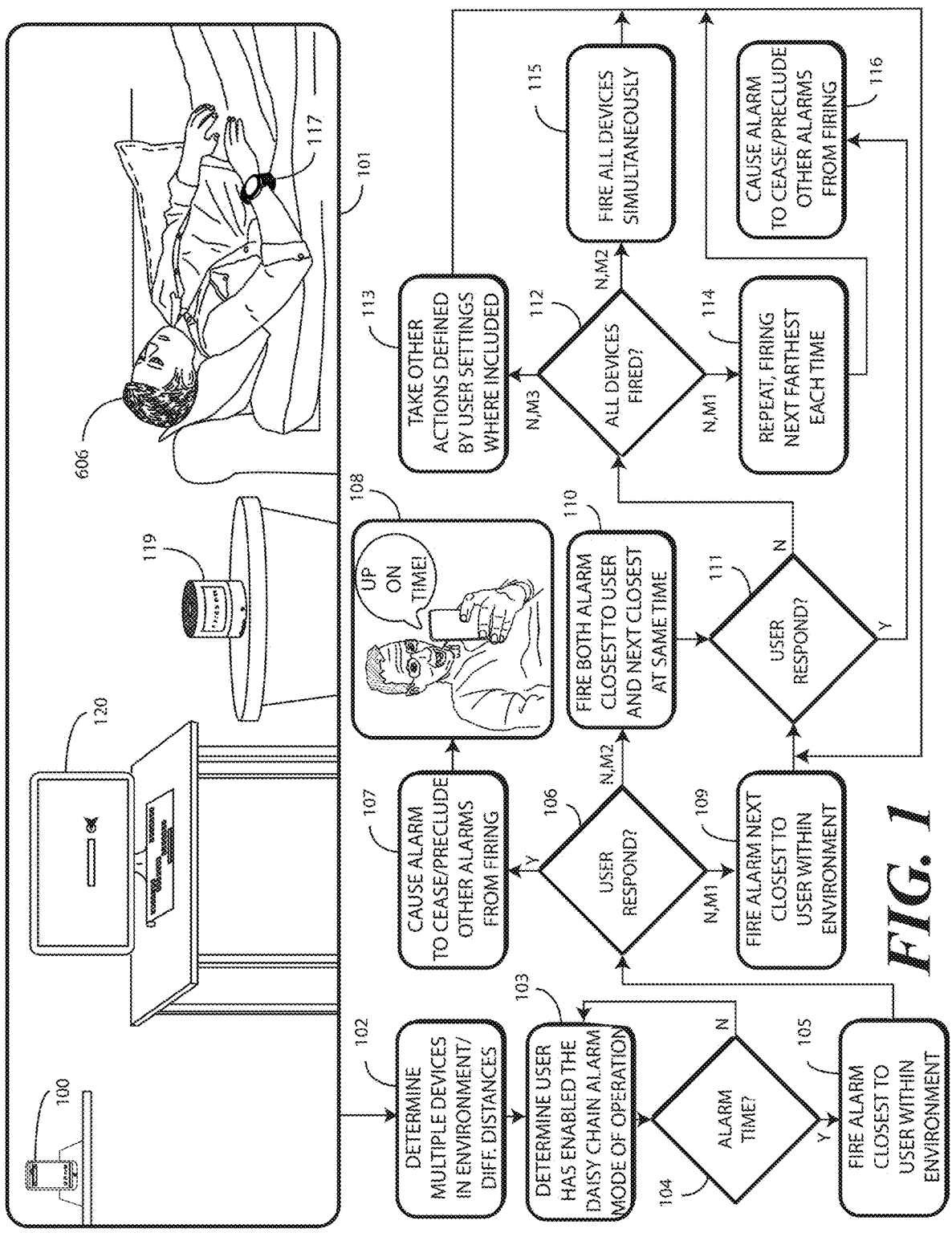
FIG. 1 illustrates one explanatory method and system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting, with a communication device of an electronic device, at least one companion electronic device operating within an environment of the electronic device, determining, with one or more processors of the electronic device, a location of both the electronic device and of the at least one companion electronic device of the plurality of electronic devices relative to an authorized user of the electronic device situated within the environment, causing, by the one or more processors, actuation of an alarm of carried by a device closest to the authorized user within the environment selected from the device closest to the authorized user is the electronic device and the at least one companion electronic device, detecting, by the one or more processors, whether user input in response to the actuation of the alarm is received by the electronic device or the at least one companion electronic device, and when the one or more processors fail to detect the user input, causing actuation of another alarm carried by a next closest device to the authorized user selected from the electronic device and the at least one companion electronic device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of, in response to detection of an alarm event, using one or more processors to cause one of a user interface of the electronic device or at least one companion electronic device to deliver an alarm to the environment and, in response to the user interface or at least one other user interface of the at least one companion electronic device failing to receive user input causing the alarm to cease, causing another of the user interface or the at least one companion electronic device to deliver another alarm to the environment as described herein. The non-processor circuits may include, but are not limited to, a radio receiver, a radio transmitter, signal drivers, clock circuits, power source circuits, and user input devices.

As such, these functions may be interpreted as steps of a method to perform determining, by one or more sensors of the electronic device, whether the electronic device or at least one companion electronic device is a closer electronic device to an authorized user of the electronic device and the companion electronic device and which of the electronic device or the at least one companion electronic device is a farther electronic device from the authorized user of the electronic device and the companion electronic device. In one or more embodiments, the method also, in response to an alarm event occurring, delivers, by the closer electronic device, an alarm to an environment of the closer electronic device, waits, by a user interface of the closer electronic device, for user input causing the alarm to cease, and when the user interface fails to receive the user input within a predefined duration, delivers, by the farther electronic device, another alarm to the environment of the farther electronic device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, oversleeping remains a persistent issue despite the widespread use of modern electronic devices for setting alarms. Factors such as fatigue, irregular sleep patterns, and psychological influences contribute to this problem, leading to missed appointments and late arrivals. Traditional methods, such as placing alarm devices at a distance to encourage users to get out of bed, often prove ineffective. Users may forget to position their devices strategically, or they may return to bed after silencing the alarm, undermining the intended purpose.

Existing solutions, including mobile alarm applications that require users to complete tasks to dismiss alarms, attempt to address oversleeping. However, these methods can be inconvenient and may not consistently ensure timely wakefulness. Devices like alarm clocks on wheels, which move to force users to get up, offer novelty but may not suit all users or environments. The challenge lies in finding a balance between effective alarm systems and practical solutions that accommodate diverse user behaviors and preferences.

Figure 6:
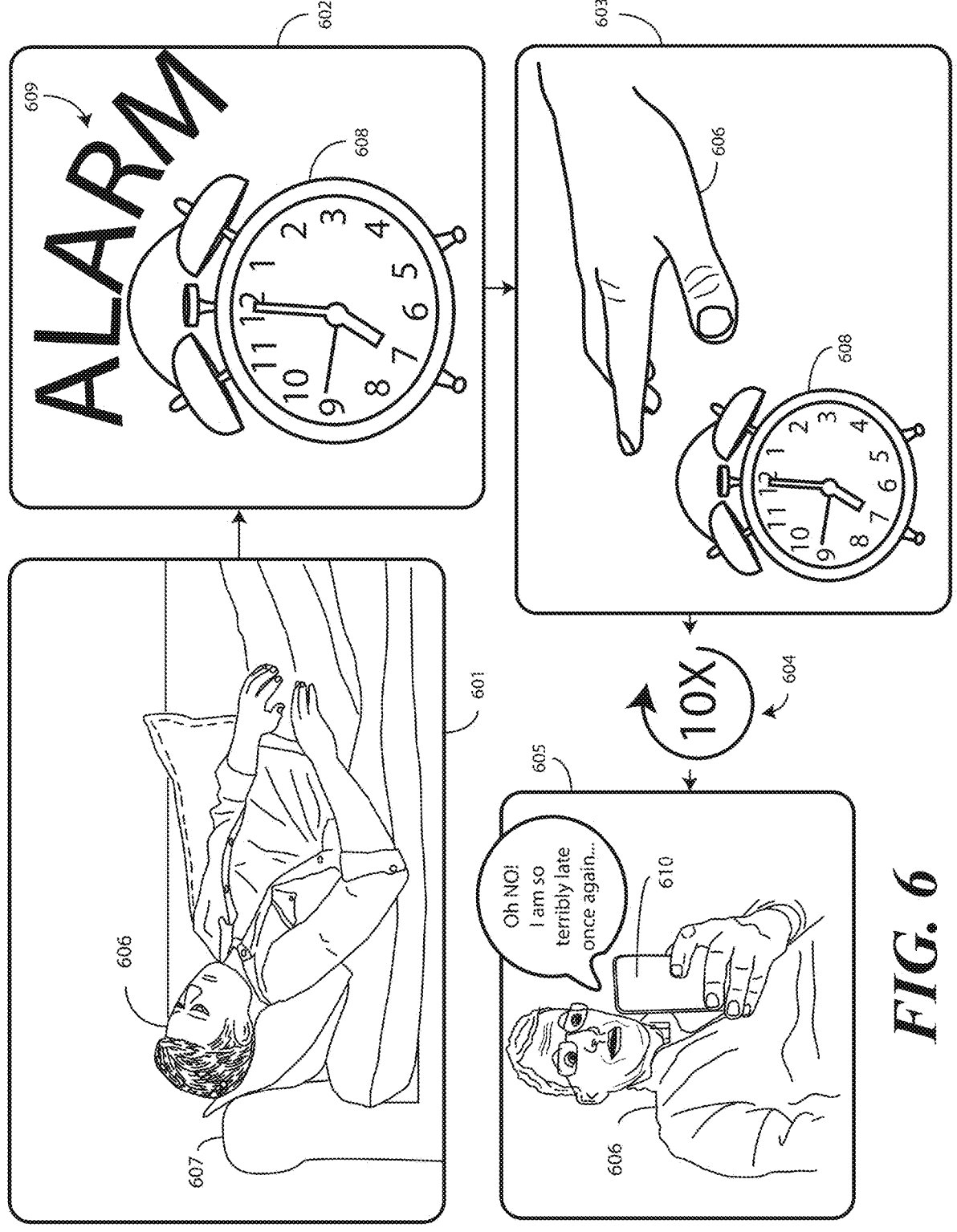
FIG. 6 illustrates a prior art method.

Illustrating by example, turn briefly to FIG. 6. At step 601 of FIG. 6, Henry 606 has decided to take a nap on the sofa 607. Henry 606 needs to wake up at a specific time to attend his jazz trio gig at a nearby hotel. The hotel, renowned for the luxurious ambiance and exquisite service, attracts a sophisticated clientele who appreciate fine music and elegant surroundings. Guests often gather to enjoy the live performances, creating an atmosphere of cultural refinement and entertainment. The hotel's reputation for hosting talented musicians enhances the allure, making the venue a sought-after location for both performers and patrons.

Henry's performance typically includes playing "Segment" by Charlie Parker, a piece that resonates with the audience due to the intricate melodies and historical significance in the jazz genre. Indeed, it is one of the few minor tunes Parker wrote and performed. Accordingly, the hotel's patrons eagerly anticipate hearing this classic, as the piece embodies the essence of jazz and showcases Henry's talent.

To ensure he wakes up on time and avoids disappointing his bassist and drummer, Henry 606 has strategically placed an alarm clock 608 nearby. This placement allows him to rest assured, knowing that the alarm will alert him promptly, enabling him to prepare for the performance and maintain harmony within the trio.

At step 602 of FIG. 6, the alarm clock 608 sounds the alarm 609, signaling that Henry 606 wake up and start practicing the B-flat minor diminished scale. This scale, learned from the renowned pianist Barry Harris at his jazz workshops in New York, holds significant importance in jazz music. Barry Harris, a legendary figure in the jazz community, imparts a deep understanding of harmony and improvisation techniques, making his teachings for aspiring musicians. His workshops provide insights into the intricacies of jazz, enabling musicians like Henry 606 to enhance their skills and creativity.

Despite the importance of these lessons, Henry 606 has a notorious habit of hitting the snooze button on the alarm clock 608, as depicted at step 603. This tendency often leads to underestimating the time required to prepare for his gigs. The allure of additional sleep frequently results in Henry 606 misjudging the time needed to travel to the venue, causing unnecessary stress and potential delays. This habitual behavior underscores the challenge of balancing rest with the demands of a musician's schedule, particularly when striving to incorporate complex jazz techniques into performances.

Sadly, Henry 606 hits the snooze button not once, but ten additional times 604. At step 605 of FIG. 6, Henry 606 wakes up to discover that he is significantly late once more. The jazz trio, unable to wait any longer, has substituted Amit, a renowned sitar player known for his expertise in the music of Thelonious Monk. Amit's performance captivates the audience as he delivers a stunning rendition of "Ask Me Now," a piece that seamlessly blends the intricate melodies of jazz with the tonal qualities of the sitar.

The crowd responds with enthusiasm, appreciating the innovative fusion of styles and the skillful interpretation of Monk's work. Amit's ability to adapt the sitar to jazz standards not only impresses the audience but also elevates the performance to a memorable experience. This turn of events leaves Henry 606 without a role in the trio, as Amit's success highlights the potential for diverse musical expressions within the ensemble.

This example demonstrates that, in practical scenarios, users such as poor Henry 606 often encounter challenges with traditional alarm systems, leading to missed commitments and frustration. Even if an individual sets multiple alarms on various devices to ensure timely wakefulness, despite these efforts the process of disabling each alarm can become cumbersome, especially on days when the user wakes up promptly. This inconvenience highlights the need for a more efficient alarm management system that adapts to user behavior and preferences.

Consider a situation where a user places a smartphone alarm nearby, intending to wake up on time. The proximity of the device allows for easy snoozing, resulting in oversleeping and missed appointments. The user attempts to place the device farther away to encourage getting out of bed, but this strategy often fails due to forgetfulness or the ease of returning to bed after silencing the alarm. These examples underscore the complexity of human behavior and the need for a dynamic alarm system that can adjust to varying circumstances and ensure punctuality without relying solely on user memory or effort.

The disclosed system advantageously addresses these challenges by leveraging connected devices to create a more reliable wake-up method. By dynamically shifting alarms among devices located at different distances, embodiments of the disclosure encourage user engagement and timely wakefulness. This approach not only reduces the hassle of managing multiple alarms but also enhances the likelihood of the user responding to the alarm, thereby minimizing the risk of oversleeping and the associated consequences.

In one or more embodiments, a method in an electronic device that involves detecting at least one companion electronic device operating within the environment of the electronic device. In one or more embodiments, the method includes determining the location of both the electronic device and the companion electronic device relative to an authorized user situated within the environment. In one or more embodiments, the method further involves causing the actuation of an alarm carried by the device closest to the authorized user, selected from either the electronic device or the companion electronic device.

In one or more embodiments, the method also includes detecting whether user input in response to the actuation of the alarm is received by either the electronic device or the companion electronic device. If the processors fail to detect the user input, in one or more embodiments the method causes the actuation of another alarm carried by the next closest device to the authorized user, selected from the electronic device and the companion electronic device. This process ensures that the alarm continues to engage the user by shifting to the next closest device if the initial alarm does not receive a response.

Advantageously, in one or more embodiments the method enables a dynamic alarm management system by detecting companion electronic devices within the environment and determining their relative locations to the user. This arrangement allows the system to actuate an alarm on the device closest to the user, ensuring that the alarm is initially delivered in a manner that is most likely to be noticed by the user.

By shifting the alarm to the next closest device if no user input is detected, the system advantageously and effectively addresses the issue of oversleeping by maintaining user engagement. This approach leverages the spatial arrangement of devices to create a more reliable wake-up method, reducing the likelihood of the user ignoring the alarm and minimizing the risk of missed commitments.

The use of multiple connected devices enhances the adaptability of the alarm system, allowing it to adjust to varying user behaviors and preferences. This method provides a practical solution to the problem of oversleeping by ensuring that alarms are not easily dismissed without user interaction, thereby improving punctuality and adherence to schedules.

Accordingly, embodiments of the disclosure advantageously manage alarms across connected devices to address the shortcomings of current solutions. By determining a set of multiple devices located at various distances within an audible range, the system initiates alarms on the device closest to the user. If the user does not respond within a configurable threshold, the alarm shifts to the next closest device. This approach leverages connected devices to create a dynamic and adaptable alarm system, enhancing the likelihood of user engagement and timely wakefulness.

In one or more embodiments, a system manages alarms across connected devices by determining a set of multiple devices located at various distances within an audible range of the user. The system initiates the alarm on the device closest to the user. If the user does not respond within a configurable threshold duration or snoozes the alarm beyond a threshold number of instances, the system shifts the alarm to the next closest device. This process continues until the user takes an affirmative action, such as dismissing the alarm.

The system includes various types of electronic devices, such as smartphones, smartwatches, televisions, tablets, personal computers, and smart home devices like doorbells or voice assistant devices. In one embodiment, the alarm may ring simultaneously on the first device and the second device. This dynamic shifting of alarms among connected devices encourages user engagement and timely wakefulness, reducing the hassle of managing multiple alarms and enhancing the likelihood of the user responding to the alarm.

In one or more embodiments, an electronic device comprises a user interface and a communication device that interacts with at least one companion electronic device situated within the environment of the electronic device. In one or more embodiments, the electronic device includes one or more processors operable with the user interface and the communication device.

In one or more embodiments, in response to detecting an alarm event, the processors cause either the user interface or the companion electronic device to deliver an alarm to the environment. If the user interface or another user interface of the companion electronic device fails to receive user input that causes the alarm to cease, the processors can cause another of the user interface or the companion electronic device to deliver another alarm to the environment.

Advantageously, embodiments of the disclosure provide s a system where the processors cause the alarm to be delivered simultaneously by both the user interface of the electronic device and the companion electronic device. This arrangement ensures that the alarm is more likely to be noticed by the user, as it increases the auditory presence of the alarm within the environment. By leveraging multiple devices to deliver the alarm concurrently, the system advantageously enhances the probability of user engagement, thereby reducing the risk of oversleeping and missed commitments.

The simultaneous actuation of alarms on multiple devices also provides redundancy, ensuring that if one device fails to deliver the alarm due to technical issues or user oversight, the other device can still alert the user. This redundancy improves the reliability of the alarm system, making it more robust compared to traditional single-device alarm systems.

In one or more embodiments, a method in an electronic device that involves determining, by one or more sensors of the electronic device, whether the electronic device or at least one companion electronic device is a closer electronic device to an authorized user of the electronic device and the companion electronic device. In one or more embodiments, the method further identifies which of the electronic device or the at least one companion electronic device is a farther electronic device from the authorized user of the electronic device and the companion electronic device.

In response to an alarm event occurring, in one or more embodiments the method delivers, by the closer electronic device, an alarm to an environment of the closer electronic device. In one or more embodiments, the method includes waiting, by a user interface of the closer electronic device, for user input causing the alarm to cease. When the user interface fails to receive the user input within a predefined duration, the method delivers, by the farther electronic device, another alarm to the environment of the farther electronic device.

By determining which device is closer or farther from the authorized user, the system can strategically deliver alarms in a manner that increases the likelihood of user engagement. This spatial awareness advantageously allows the alarm to be initially delivered by the closer device, ensuring it is more likely to be noticed by the user.

When the user interface of the closer device fails to receive user input within a predefined duration, the system shifts the alarm to the farther device. This transition not only maintains user engagement but also advantageously leverages the increased audibility of the farther device, enhancing the chances of waking the user.

Implementing this method with a wearable electronic device as the closer device and a smartphone as the farther device additionally provides a practical application. The wearable device offers immediate proximity alerts, while the smartphone, being louder, serves as a secondary alert, ensuring redundancy and reliability in the alarm system. Other advantages will be described below. Still others will be obvious to those of ordinary skill in the art having the benefit of this disclosure.

Turning now to FIG. 1, at step 101 Henry 606 is again sleeping on the couch before his hotel gig. However, in FIG. 1, Henry 606 advantageously avails himself of embodiments of the disclosure. To wit, Henry is wearing a smartwatch 117 that has an alarm set. However, Henry also has within his environment, a plurality of companion electronic devices that have communication devices that can communicate with the communication device of the smartwatch 117.

In this illustrative embodiment, these companion electronic devices include a smart speaker 119, a computer 120, and an electronic device 100 configured as a smartphone. The smart speaker 119 comprises an Internet of Things (IoT) device. As shown at step 101, the smartwatch 117 is situated closest to Henry 606, while the smart speaker 119 is the next closest device. The computer 120 is the third closest device, while the smartphone, which is charging on the shelf, is the farthest device within the environment from Henry 606.

At step 102, a communication device of the smartwatch 117 detects, with a communication device, at least one companion electronic device operating within the environment. In this example, step 102 results in the one or more processors of the smartwatch 117 detecting each of the smart speaker 119, the computer 120, and the smartphone.

In one or more embodiments, step 102 further comprises determining, with one or more processors of the smartwatch 117, a location of each of the smartwatch and the various companion electronic devices within the environment. At step 102 of FIG. 1, one or more processors of the smartwatch 117 determine the location of each companion device, including the smart speaker 119, the computer 120, and the smartphone.

The processors can utilize various techniques to ascertain these locations. One method involves leveraging Bluetooth signal strength, where the smartwatch 117 measures the Received Signal Strength Indicator (RSSI) from each device. By comparing the RSSI values, the processors can infer proximity, with stronger signals indicating closer devices. This technique provides a straightforward and efficient means of determining relative distances without requiring additional hardware.

Another technique employs Wi-Fi triangulation, where the smartwatch 117 connects to a Wi-Fi network shared with the companion devices. By analyzing the time delay in signal transmission between the smartwatch 117 and each companion electronic device, the processors calculate the relative distances. This method offers enhanced accuracy, particularly in environments with multiple access points, allowing for precise location determination.

Additionally, the smartwatch 117 may utilize Ultra-Wideband (UWB) technology, which provides high-precision location tracking by measuring the time-of-flight of radio waves between the smartwatch 117 and the companion electronic devices. UWB offers centimeter-level accuracy, making UWB suitable for environments where precise location data is necessary. By employing these techniques, the processors determine that the smartwatch 117 is closest to Henry 606, the smart speaker 119 is the second closest, the computer 120 is the third closest, and the smartphone is the most distant. Each method offers distinct advantages in terms of accuracy, efficiency, and hardware requirements, allowing for flexible implementation based on the specific needs of the environment. Other techniques for performing these tasks will be obvious to those of ordinary skill in the art having the benefit of this disclosure.

At step 103, the one or more processors of the smartwatch 117 determine that Henry 606 has enabled, using one or more user settings, a daisy chain alarm mode of operation. In one or more embodiments, the one or more processors cause actuation of the other alarms carried by the next closest device to the authorized user, such as at step 109, step 110, or step 114 only when a daisy-chain mode of operation has been enabled, as determined at step 103.

Decision 104 then determines whether the alarm should be fired. Where it does, step 105 comprises causing, by the one or more processors of the smartwatch 117, actuation of an alarm carried by the smartwatch 117. Step 105 fires the alarm on the smartwatch 117 because it is the alarm carried by the device closest to the authorized user of the electronic devices of the environment, who is Henry 606.

Decision 106 then detects, using a user interface and the one or more processors of the smartwatch 117, whether user input in response to the actuation of the alarm is received. In one or more embodiments, decision 106 comprises determining whether user input in response to actuation of the alarm is received by any of the companion electronic devices operating within the environment. Where such user input is received, step 107 comprises causing the alarm to cease.

As shown at step 108, the system effectively engages Henry 606, ensuring timely wakefulness. With the additional time afforded by the system, Henry 606 dedicates himself to mastering the B-flat diminished scale, a technique imparted by Barry Harris. This practice session includes exploring tritone substitutions for the F-dominant seven chord, enhancing his musical repertoire. The system's ability to adapt to Henry's behavior ensures he remains on schedule, allowing for focused preparation.

Later that evening, Henry's performance at the gig receives numerous standing ovations. His rendition, enriched by the morning's practice, rivals those of renowned pianist Kenny Barron. The system's strategic alarm management contributes to Henry's success, highlighting the practical application of connected devices in supporting user commitments and enhancing personal achievements.

However, imagine an alternate universe scenario where Henry 606, renowned for hitting the snooze button, actually fails to deliver user input stopping the alarm to the smartwatch 117. Imagine instead that Henry 606 delivers other user input to the smartwatch 117 causing the alarm to enter a snooze mode of operation. Advantageously, in this alternate example the smartwatch 117, failing to detect user input causing the alarm to cease, is operable to shift the alarm to the smart speaker 119, maintaining auditory presence. In one or more embodiments, step 109 causes actuation of the another alarm carried by the next closest device to the authorized user only when failing to detect the user input for at least a predefined duration, as determined by decision 106.

This dynamic alarm management system capitalizes on the spatial arrangement of devices, prompting Henry 606 to rise promptly. Said differently, when the one or more processors of the smartwatch 117 fail, at decision 106, to detect user input causing the alarm fired at step 105 to cease, step 109 or step 110 can cause actuation of another alarm carried by a next closest device to the authorized user selected from the companion electronic devices situated within the environment.

This firing the next closest alarm can occur in different ways. Illustrating by example, at step 109, an alarm carried by the smart speaker 119 is fired. Embodiments of the disclosure contemplate a system where alarms progressively activate on devices located at increasing distances from the user, such as Henry 606. This method strategically reduces the likelihood of the user repeatedly hitting the snooze button. By initiating the alarm on the closest device and subsequently shifting to devices farther away, the system creates a physical challenge for the user to silence the alarm. This approach leverages the spatial arrangement of connected devices to encourage the user to rise and remain awake.

The system's design ensures that each subsequent alarm requires more effort to deactivate, thereby diminishing the convenience of snoozing. As the alarm shifts to a device located at a greater distance, the user physically moves to silence the alarm, disrupting the cycle of returning to sleep. This gradual increase in effort aligns with the goal of promoting wakefulness and adherence to schedules, addressing the common issue of oversleeping.

By employing this method, the system effectively engages the user in a manner that traditional single-device alarms may not achieve. The dynamic shifting of alarms among multiple devices not only enhances the likelihood of user interaction but also supports the user's commitment to waking up on time. This innovative approach provides a practical solution to the challenges associated with maintaining punctuality and managing daily routines.

Thus, in an illustrative example at least one companion electronic device situated within the environment comprises at least a first companion electronic device, e.g., the smartwatch 117, and a second companion electronic device, e.g., the smart speaker 119. Moreover, one of the electronic device or the first companion electronic device is the device closest to the authorized user within the environment and another of the electronic device or the first companion electronic device is next closest device to the authorized user within the environment. Step 105 fires the alarm of the closest electronic device, which is the smartwatch 117, while step 109 fires the next closest alarm, which is carried by the smart speaker 119.

By contrast, step 110 fires the alarm of the smartwatch 117 simultaneously with the alarm of the smart speaker 119. Said differently, in one or more embodiments step 110 further comprises, when the one or more processors of the smartwatch 117 fail to detect the user input ceasing the alarm fired at step 105, causing the actuation of the alarm carried by the device closest to the authorized user, e.g., the smartwatch 117, simultaneously with the actuation of the another alarm carried by the next closest device to the authorized user, e.g., the smart speaker 119. Whether decision 106 moves to step 109 where a single device alarm is fired or step 110 where multiple alarms are fired simultaneously, can be configured in one or more user settings.

Decision 111 then detects, by the one or more processors, such as the one or more processors carried by the smart speaker 119, whether other user input in response to the actuation of the other alarm at step 109 or step 110 is received in response to the actuation of the another alarm. When such user input is received, step 116 can cause the alarm(s) to cease. When the one or more processors fail to detect the other user input at decision 111, decision 112 determines whether all alarms of all companion electronic devices within the environment have been fired.

At this point of the discussion, only the alarms of the smartwatch 117 and the smart speaker 119 have fired. Accordingly, step 114 comprises causing actuation of an additional alarm carried by an additional companion electronic device, which would be the alarm carried by the computer 120. As before, step 114 can comprise firing the alarm of the computer 120 alone in one or more embodiments. In other embodiments, step 115 can comprise firing the alarms of the smartwatch 117, the smart speaker 119, and the computer 120 simultaneously.

The process can continue until all alarms have fired. When this is the case, and the method proceeds to step 113, other actions can be taken to wake Henry 606. These other actions can be defined in user settings. Examples of such other actions comprise causing lighting, heating or cooling systems, blinds and shades, or other connected devices to change their course of action and operation.

Illustrating by example, once all alarms of all companion electronic devices have fired, either individually at step 114, simultaneously at step 115, or combinations thereof, the system may initiate additional actions to ensure user engagement at step 113. One such action involves activating a connected smart lighting system to gradually increase the brightness in the user's environment. This method leverages the natural response to light as a wake-up cue, enhancing the likelihood of the user waking up without relying solely on auditory stimuli. The gradual increase in light intensity can create a more pleasant waking experience, reducing the abruptness often associated with alarms.

Another action includes sending a notification to a secondary device, such as a smart speaker 119 or a connected display of the computer 120 or smartphone, to provide a verbal reminder of the user's schedule or commitments for the day. This approach not only reinforces the need to wake up but also offers contextual information that may motivate the user to rise promptly. By integrating schedule reminders, the system aligns the wake-up process with the user's daily responsibilities, promoting punctuality and organization.

Additionally, the system may engage a connected coffee maker or other smart appliances to begin preparing morning routines. This action provides a tangible incentive for the user to get out of bed, as the aroma of freshly brewed coffee or the readiness of breakfast can serve as a motivating factor. By incorporating these practical elements, the system enhances the overall wake-up experience, making the wake-up process more appealing and effective in encouraging timely wakefulness. Other actions that can be taken at step 113 will be obvious to those of ordinary skill in the art having the benefit of this disclosure.

Figure 2:
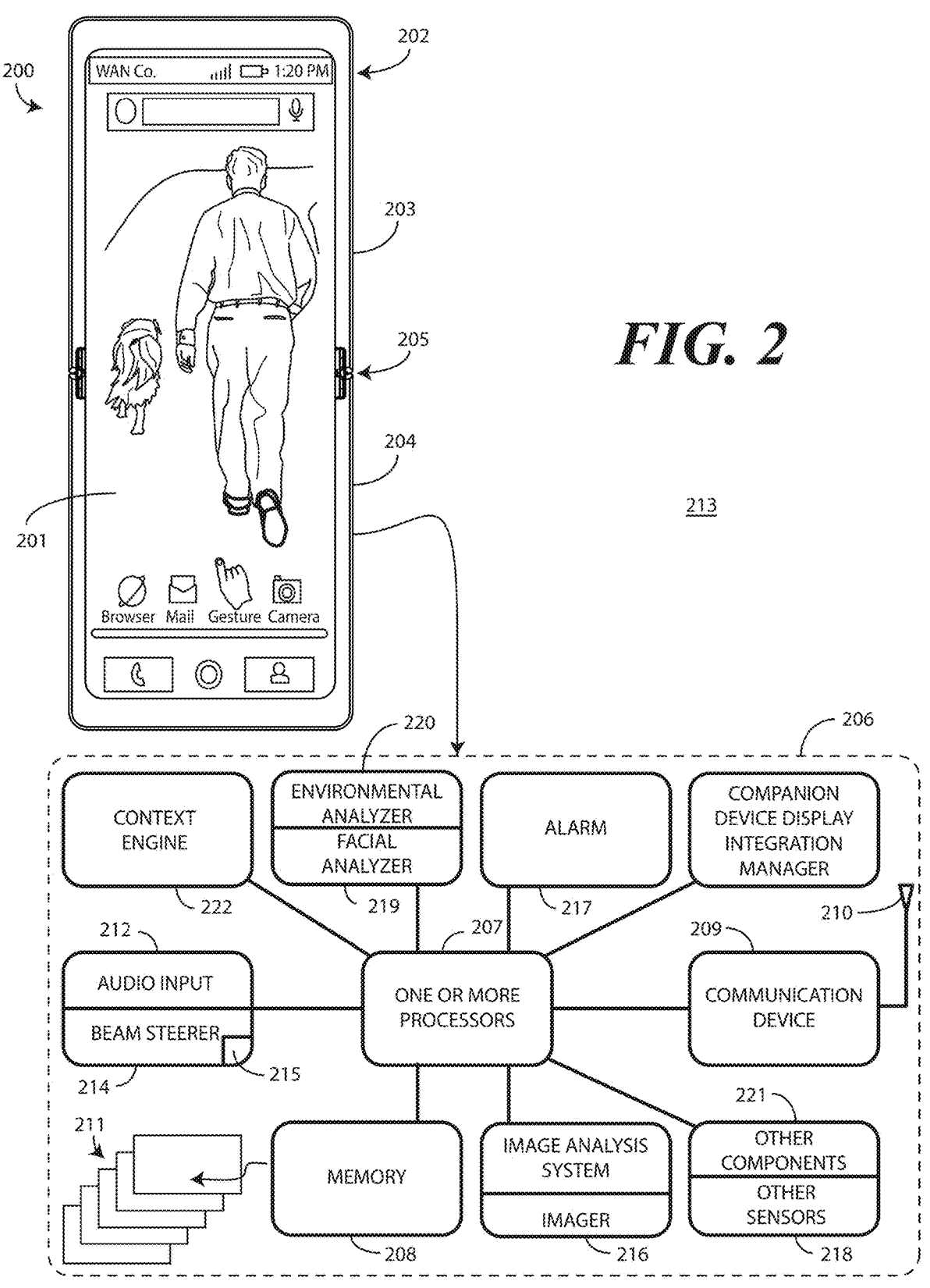
FIG. 2 illustrates one explanatory electronic device in accordance with one or more embodiments of the disclosure.

The electronic device 100 shown as a smartphone in FIG. 1 can operate as a stand-alone electronic device in one or more embodiments. However, in the illustrative example of FIG. 1, the electronic device 100 can operate in tandem with one or more companion electronic devices, via wireless electronic communication or via a wired connection channel. Turning now to FIG. 2, illustrated therein are additional details of the electronic device 100.

The electronic device 100 of FIG. 2 is a portable electronic device and is shown as a smartphone for illustrative purposes. However, it should be obvious to those of ordinary skill in the art having the benefit of this disclosure that other electronic devices may be substituted for the explanatory smart phone of FIG. 2. For example, the electronic device 100 could equally be a conventional desktop computer, palm-top computer, a tablet computer, a gaming device, a media player, or other device.

This illustrative electronic device 100 includes a display 201, which may optionally be touch-sensitive. Users can deliver user input to the display 201, which serves as a user interface for the electronic device 100. In one embodiment, users can deliver user input to the display 201 of such an embodiment by delivering touch input from a finger, stylus, or other objects disposed proximately with the display 201. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 2 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position. In other embodiments, the device housing 202 will be rigid and will include no hinge.

In still other embodiments, the device housing 202 will be manufactured from a flexible material such that it can be bent and deformed. Where the device housing 202 is manufactured from a flexible material or where the device housing 202 includes a hinge, the display 201 can be manufactured on a flexible substrate such that it bends. In one or more embodiments, the display 201 is configured as a flexible display that is coupled to the first device housing

203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 100. In one or more embodiments, the block diagram schematic 206 is configured as a printed circuit board assembly disposed within the device housing 202 of the electronic device 100. Various components can be electrically coupled together by conductors, or a bus disposed along one or more printed circuit boards.

The illustrative block diagram schematic 206 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

In one embodiment, the electronic device includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation.

In this illustrative embodiment, the block diagram schematic 206 also includes a communication device 209 that can be configured for wired or wireless communication with one or more other devices or networks. The networks can include a wide area network, a local area network, and/or personal area network. The communication device 209 may also utilize wireless technology for communication, such as, but are not limited to, peer-to-peer or ad hoc communications such as HomeRF, Bluetooth and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth.

In one or more embodiments, the block diagram schematic 206 includes an audio input/processor 212. The audio input/processor 212 is operable to receive audio input from an environment 213 about the electronic device 100. The audio input/processor 212 can include hardware, executable code, and speech monitor executable code in one embodiment. The audio input/processor 212 can be operable with one or more predefined identification references stored in memory 208.

With reference to audio input, the predefined identification references can comprise representations of basic speech models, representations of trained speech models, or other representations of predefined audio sequences that are used by the audio input/processor 212 to receive and identify voice commands that are received with audio input captured by an audio capture device. In one embodiment, the audio input/processor 212 can include a voice recognition engine. Regardless of the specific implementation utilized in the various embodiments, the audio input/processor 212 can access various speech models stored with the predefined identification references to identify speech commands, languages being spoken, and other information.

The audio input/processor 212 can include a beam steering engine 214 comprising one or more microphones 215. Input from the one or more microphones 215 can be processed in the beam steering engine 214 such that the one or more microphones define a virtual microphone. This virtual microphone can define an acoustic reception cone that can be virtually "steered" around the electronic device 100. Alternatively, actual steering can occur as well, such as switching between a left and right microphone or a front and back microphone or switching various microphones ON and OFF individually. In one or more embodiments, two or more microphones 215 can be included for selective beam steering by the beam steering engine 214.

Illustrating by example, a first microphone can be located on a first side of the electronic device 100 for receiving audio input from a first direction, while a second microphone can be placed on a second side of the electronic device 100 for receiving audio input from a second direction. These microphones can be "steered" by selectively turning them ON and OFF.

The beam steering engine 214 can then select between the first microphone and the second microphone to beam steer audio reception toward an object, such as a user delivering audio input. This beam steering can be responsive to input from other sensors, such as imagers, facial depth scanners 219, thermal sensors, or other sensors. For example, an imager 216 can estimate a location of a person's face and deliver signals to the beam steering engine 214 alerting it in which direction to focus the acoustic reception cone and/or steer the first microphone and the second microphone, thereby adding confirmation to audio steering and saving time. Where multiple people are around the electronic device 100, this steering advantageously directs a beam reception cone toward a particular person so that languages spoken, language preferences, and other information about the person's speech can be ascertained.

Alternatively, the beam steering engine 214 processes and combines the signals from two or more microphones to perform beam steering. The one or more microphones 215 can be used for voice commands and/or for language recognition. In response to control of the one or more microphones 215 by the beam steering engine 214, a user location direction can be determined. The beam steering engine 214 can then select between the first microphone and the second microphone to beam steer audio reception toward the user. Alternatively, the audio input/processor 212 can employ a weighted combination of the microphones to beam steer audio reception toward the user.

The one or more processors 207 can perform filtering operations on audio input received by the audio input/processor 212. For example, in one embodiment the one or more processors 207 can filter the audio input into identifiable audio input, i.e., first audio input, and other audio input that is not identifiable, i.e., second audio input.

Various sensors 218 can be operable with the one or more processors 207. One example of a sensor that can be included with the various sensors 218 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 100 by establishing electric field lines between pairs of capacitive sensors and then detecting perturbations of those field lines.

Another example of a sensor that can be included with the various sensors 218 is a geo-locator that serves as a location detector. In one embodiment, location detector is able to determine location data when authenticating a user. Location can be determined by capturing the location data from a constellation of one or more earth orbiting satellites, or from a network of terrestrial base stations to determine an approximate location. The location detector may also be able to determine location by locating or triangulating terrestrial base stations of a traditional cellular network, or from other local area networks, such as Wi-Fi networks.

Another example of a sensor that can be included with the various sensors 218 is an orientation detector operable to determine an orientation and/or movement of the electronic device 100 in three-dimensional space. Illustrating by example, the orientation detector can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The orientation detector can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

An identification system is operable with the one or more processors 207. In one or more embodiments, the identification system is operable with both the one or more processors 207 and the communication device 209. The identification system, operating with the one or more processors 207, can cause the communication device 209, in response to the communication device 209 detecting establishment of an electrical communication channel with a companion device such as those described above with reference to FIG. 1. Illustrating by example, the identification system can cause the communication device 209 to query the companion device to determine locations and proximity to an authorized user of the electronic device 100.

In one or more embodiments, in response to detection of an alarm event, the one or more processors 207 cause one of the user interface or at least one companion electronic device to deliver an alarm to the environment 213. Illustrating by example, the one or more processors 207 may cause an alarm 217 carried by the electronic device 100 to fire in response to the alarm event. In one or more embodiments, in response to the user interface or at least one other user interface of the at least one companion electronic device failing to receive user input causing the alarm to cease, the one or more processors 207 can cause another of the user interface or the at least one companion electronic device to deliver another alarm to the environment 213 as described above.

In an embodiment such as that described above with reference to FIG. 1, the one or more processors 207 select which of the user interface or the at least one companion electronic device deliver the alarm to the environment by determining which of the electronic device 100 or the companion electronic device is closer to a user interface situated within the environment 213. In other embodiments, the one or more processors 207 cause the one of the user interface or the at least one companion electronic device to deliver the alarm to the environment 213 simultaneously with the another of the user interface or the at least one companion electronic device when the another of the user interface or the at least one companion electronic device delivers the another alarm to the environment. In one or more embodiments, the alarm and the another alarm are both audio alarms and the another alarm is louder than the alarm.

In other embodiments, rather than starting with the alarm that is closest to the authorized user and then proceeding to the next farthest, followed by the next farthest, followed by the next farthest, and so forth, the one or more processors 207 can select which alarm to fire based upon sounds level. Illustrating by example, in one or more embodiments the one or more processors 207 can start with the softest alarm and move to the loudest alarm, regardless of proximity to the authorized user. In other embodiments, the one or more processors 207 can start with the loudest alarm and move to the softest alarm. Said differently, in one or more embodiments the one or more processors 207 select which of the user interface or the at least one companion electronic device deliver the alarm to the environment by determining which of the electronic device or the companion electronic device is louder.

Other techniques for prioritizing which alarm to fire can be used as well. Illustrating by example, in another embodiment the one or more processors 207 may select as the first alarm to fire the companion electronic device that the authorized user is least likely to cause to enter a snooze mode of operation. Said differently, in one or more embodiments one or more processors 207 select which of the user interface or the at least one companion electronic device deliver the alarm to the environment 213 by determining which of the electronic device 100 or the companion electronic device is more frequently deactivated by the authorized user when delivering alarm signals to the environment 213. In one or more embodiments, the one of the user interface or the at least one companion electronic device caused to deliver the alarm to the environment is less frequently deactivated when delivering alarm signals to the environment 213 that the another of the user interface or the at least one companion electronic device caused to deliver the another alarm to the environment 213. Other techniques for prioritizing which alarm to fire will be obvious to those of ordinary skill in the art having the benefit of this disclosure.

Other components 221 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 221 can also include proximity sensors. The proximity sensors fall into one of two camps: active proximity sensors and "passive" proximity sensors. Either the proximity detector components or the proximity sensor components can be generally used for gesture control and other user interface protocols.

The other components 221 can optionally include a barometer operable to sense changes in air pressure due to elevation changes or differing pressures of the electronic device 100. The other components 221 can also optionally include an environmental sensor 220 such as a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 100. Similarly, a temperature sensor can be configured to monitor temperature about an electronic device.

A context engine 222 can then be operable with the various sensors to detect, infer, capture, and otherwise determine persons and actions that are occurring in an environment 213 about the electronic device 100. For example, where included one embodiment of the context engine 222 determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine 222 in detecting multi-modal social cues, emotional states, moods, and other contextual information. The context engine 222 can comprise an artificial neural network or other similar technology in one or more embodiments.

It is to be understood the elements of FIG. 2 illustrated are provided for illustrative purposes only in accordance with embodiments of the disclosure. FIG. 2 is not intended to be a complete schematic diagram of the various components required. Therefore, other electronic devices in accordance with embodiments of the disclosure may include various other components obvious to those of ordinary skill in the art having the benefit of this disclosure, but not shown in FIG. 2, or may include a combination of two or more components or a division of a particular component into two or more separate components, and still be within the scope of the present disclosure.

Figure 3:
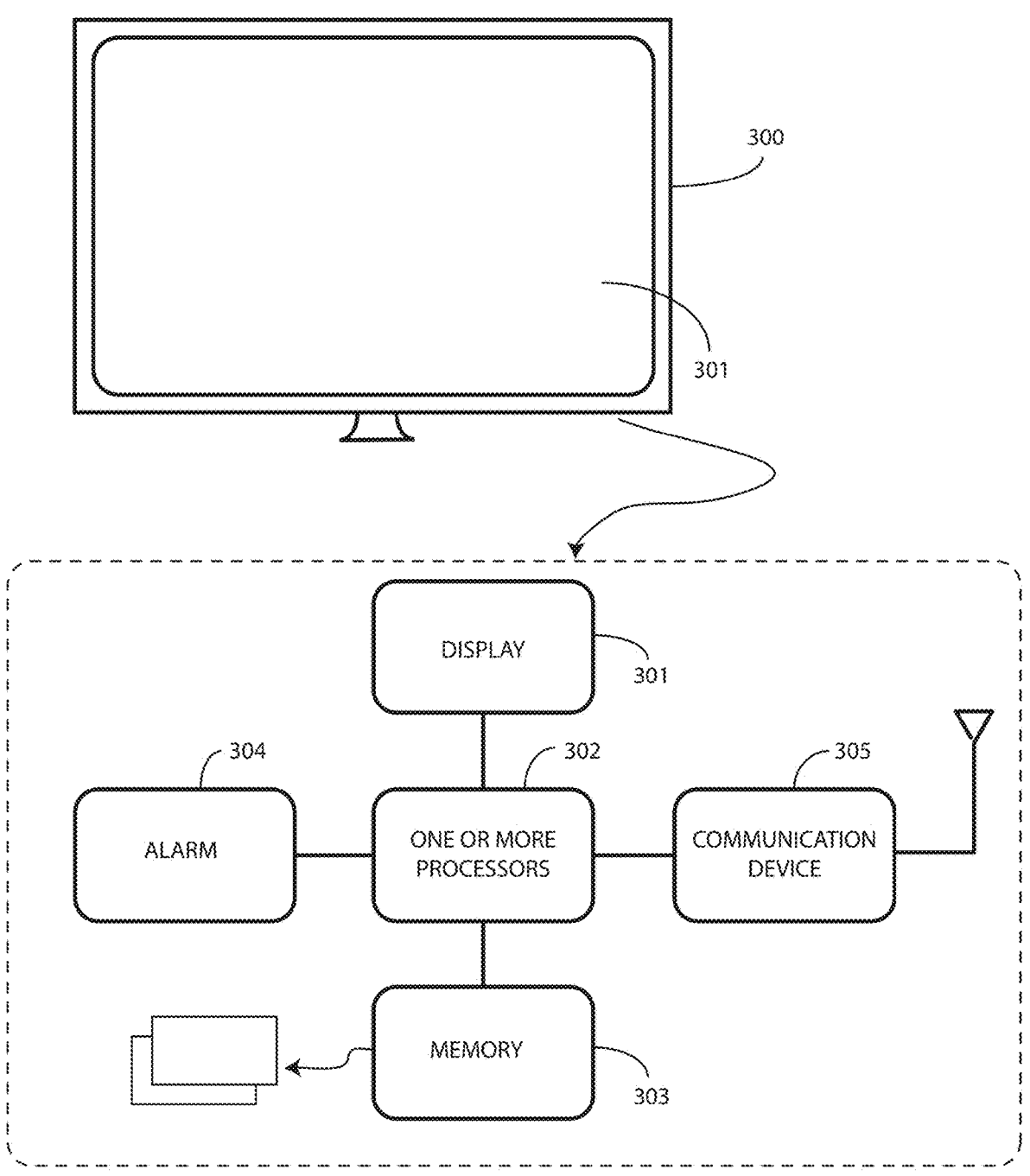
FIG. 3 illustrates one explanatory companion electronic device in accordance with one or more embodiments of the disclosure.

Turning now to FIG. 3, illustrated therein is an explanatory companion device 300 operable with the electronic device (200) of FIG. 2. In this illustrative embodiment, the companion device 300 comprises a color video monitor.

In other embodiments, the companion device 300 can take other forms. Illustrating by example, the content presentation companion device 300 can be a projector. In still other embodiments, the companion device 300 can be television, a computer display, a laptop display, a tablet computer, or a projector projecting content onto a screen. Other examples of content presentation companion devices 300 will be obvious to those of ordinary skill in the art having the benefit of this disclosure. Regardless of configuration, in one or more embodiments the companion device 300 includes one or more processors 302, a display 301, a memory 303, an audio output, an alarm 304, and a communication device 305 capable of wired or wireless communication with an electronic device such as the electronic device (100) of FIG. 2.

In one or more embodiments, when coupled by either a wireless or wired connection to such an electronic device (100), the companion device 300 can function as an alarm output device configured to fire in a daisy-chain mode of operation as explained above with reference to FIG. 1.

As will be described in more detail below with reference to the subsequent methods and method steps, the companion electronic device 300 can establish, with the communication device 305, a wired electrical communication channel with the electronic device (100). Either automatically or, alternatively, in response to queries from the electronic device (100)

The companion electronic device 300 can determine, using one or more sensors of the companion electronic device 300, whether the electronic device (100) or the companion electronic device 300 is a closer electronic device to an authorized user of the electronic device (100) and the companion electronic device 300. The one or more processors 302 can also determine which of the electronic device (100) or the companion electronic device 300 device is a farther electronic device from the authorized user of the electronic device (100) and the companion electronic device 300.

In one or more embodiments, in response to an alarm event occurring, the one or more processors 302 can deliver, using the closer electronic device, an alarm to an environment of the closer electronic device. The one or more processors 302 can wait, using a user interface of the closer electronic device, for user input causing the alarm to cease. In one or more embodiments, when the user interface fails to receive the user input within a predefined duration, the one or more processors 302 can deliver, using the farther electronic device, another alarm to the environment of the farther electronic device. Turning now to FIG. 4, illustrated therein is one explanatory method 400 for doing so.

The method 400 of FIG. 4 illustrates how, for example, the companion electronic device (300) of FIG. 3, the electronic device (100) of FIG. 2, and the other companion electronic devices of FIG. 1 can be used as a system. Beginning at step 401, the method 400 determines, by one or more sensors of an electronic device included within the system, whether the electronic device or at least one companion electronic device is a closer electronic device to an authorized user of the electronic device and the companion electronic device.

Examples of such devices that can be included within the system include smartphones 411, smartwatches 412, televisions 413, tablet computers 414, computers 415, or IoT devices 416. Other examples of such devices will be obvious to those of ordinary skill in the art having the benefit of this disclosure. In one or more embodiments, step 401 also comprises determining which of the electronic device or the at least one companion electronic device is a farther electronic device from the authorized user of the electronic device and the companion electronic device.

Decision 402 determines whether the prioritized alarm mode of operation has been enabled by the authorized user. Decision 403 determines whether it is time for an alarm to fire.

In response to an alarm event occurring, as determined by decision 403, step 404 comprises delivering, by the closer electronic device, an alarm to an environment of the closer electronic device. Decision 405 then waits, for user input causing the alarm to cease. When it is received, step 407 ceases the alarm.

When decision 405 determines that the user interface fails to receive the user input, optionally within a predefined duration from the alarm sounding, such as thirty seconds, one minute, or two minutes, step 406 delivers, by the farther electronic device, another alarm to the environment of the farther electronic device.

In one or more embodiments, step 406 makes the second alarm get louder. Said differently, in one or more embodiments the delivering the another alarm to the environment at step 406 is more audible than the delivering the alarm to the environment at step 404.

The method 400 can repeat as well. Illustrating by example, in one or more embodiments decision 408 determines whether there is a third, farther companion electronic device situated within the environment. Where it is, step 409 can continue to ring alarms farther and farther away until the user gets up. Otherwise, previously fired alarms can ring at step 410 until the user gets up and turns them off.

Figure 5:
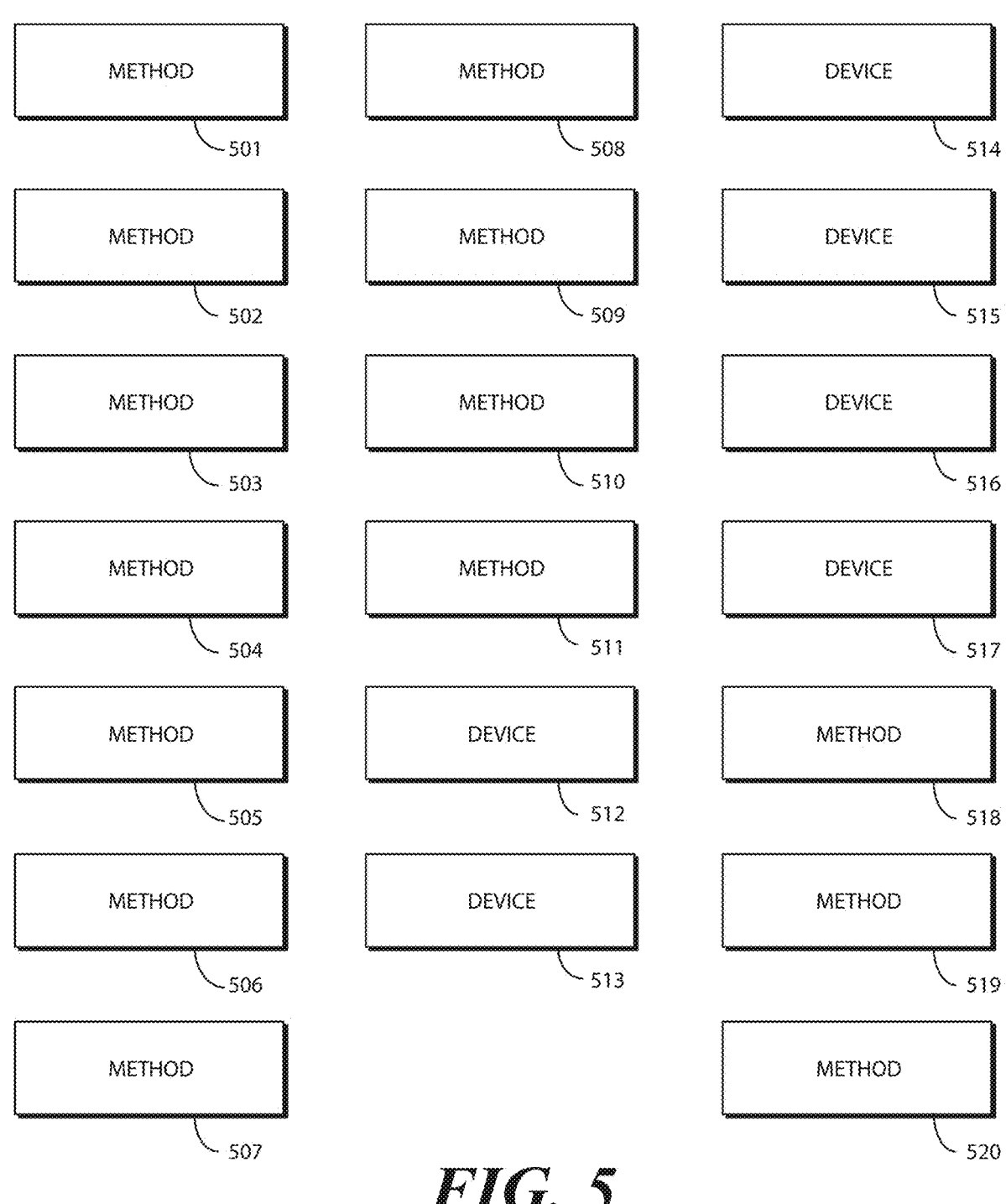
FIG. 5 illustrates various embodiments of the disclosure.

Turning now to FIG. 5, illustrated therein are various embodiments of the disclosure. The embodiments of FIG. 5 are shown as labeled boxes in FIG. 5 due to the fact that the individual components of these embodiments have been illustrated in detail in FIGS. 1-4, which precede FIG. 5. Accordingly, since these items have previously been illustrated and described, their repeated illustration is no longer essential for a proper understanding of these embodiments. Thus, the embodiments are shown as labeled boxes.

At 501, a method in an electronic device comprises detecting, with a communication device of the electronic device, at least one companion electronic device operating within an environment of the electronic device. At 501, the method comprises determining, with one or more processors of the electronic device, a location of both the electronic device and of the at least one companion electronic device to an authorized user of the electronic device situated within the environment.

At 501, the method comprises causing, by the one or more processors, actuation of an alarm carried by a device closest to the authorized user within the environment selected from the device closest to the authorized user is the electronic device and the at least one companion electronic device. At 501, the method comprises detecting, by the one or more processors, whether user input in response to the actuation of the alarm is received by the electronic device or the at least one companion electronic device. When the one or more processors fail to detect the user input, the method of 501 comprises causing actuation of another alarm carried by a next closest device to the authorized user selected from the electronic device and the at least one companion electronic device.

At 502, the method of 501 further comprises, when the one or more processors fail to detect the user input, causing the actuation of the alarm carried by the device closest to the authorized user simultaneously with the actuation of the another alarm carried by the next closest device to the authorized user. At 503, the method of 401 involves the at least one companion electronic device comprising at least a first companion electronic device and a second companion electronic device. At 503, one of the electronic device or the first companion electronic device is the device closest to the authorized user within the environment and another of the electronic device or the first companion electronic device is the next closest device to the authorized user within the environment.

At 504, the method of 403 further comprises detecting, by the one or more processors, whether other user input in response to the actuation of the another alarm is received by the electronic device or the first companion electronic device in response to the actuation of the another alarm. At 504, when the one or more processors fail to detect the other user input, the method comprises causing actuation of an additional alarm carried by the second companion electronic device.

At 505, the one or more processors of 504 cause the alarm, the another alarm, and the additional alarm to actuate simultaneously when the one or more processors fail to detect the other user input.

At 506, the electronic device of 504 comprises a smartphone. At 507, the first companion electronic device of 506 comprises a wearable electronic device. At 508, the second companion electronic device of 507 comprises an Internet of Things (IoT) device.

At 509, the one or more processors of 501 cause actuation of the another alarm carried by the next closest device to the authorized user only when a daisy-chain mode of operation has been enabled. At 510, the one or more processors of 501 cause actuation of the another alarm carried by the next closest device to the authorized user only when failing to detect the user input for at least a predefined duration.

At 511, an electronic device comprises a user interface, a communication device in communication with at least one companion electronic device situated within an environment of the electronic device, and one or more processors operable with the user interface and the communication device. At 511, in response to detection of an alarm event, the one or more processors cause one of the user interface or the at least one companion electronic device to deliver an alarm to the environment and, in response to the user interface or at least one other user interface of the at least one companion electronic device failing to receive user input causing the alarm to cease, cause another of the user interface or the at least one companion electronic device to deliver another alarm to the environment.

At 512, the one or more processors of 511 select which of the user interface or the at least one companion electronic device deliver the alarm to the environment by determining which of the electronic device or the companion electronic device is closer to an authorized user situated within the environment. At 513, the one or more processors of 511 cause the one of the user interface or the at least one companion electronic device to deliver the alarm to the environment simultaneously with the another of the user interface or the at least one companion electronic device when the another of the user interface or the at least one companion electronic device delivers the another alarm to the environment.

At 514, the alarm of 512 and the another alarm are both audio alarms and the another alarm is louder than the alarm. At 515, the one or more processors of 511 select which of the user interface or the at least one companion electronic device deliver the alarm to the environment by determining which of the electronic device or the companion electronic device is louder.

At 516, the one or more processors of 511 select which of the user interface or the at least one companion electronic device deliver the alarm to the environment by determining which of the electronic device or the companion electronic device is more frequently deactivated by the authorized user when delivering alarm signals to the environment. At 517, the one of the user interface of 516 or the at least one companion electronic device caused to deliver the alarm to the environment is less frequently deactivated when delivering alarm signals to the environment than the another of the user interface or the at least one companion electronic device caused to deliver the another alarm to the environment.

At 518, a method in an electronic device comprises determining, by one or more sensors of the electronic device, whether the electronic device or at least one companion electronic device is a closer electronic device to an authorized user of the electronic device and the companion electronic device and which of the electronic device or the at least one companion electronic device is a farther electronic device from the authorized user of the electronic device and the companion electronic device, At 518, in response to an alarm event occurring, the method comprises delivering, by the closer electronic device, an alarm to an environment of the closer electronic device.

At 518, the method comprises waiting, by a user interface of the closer electronic device, for user input causing the alarm to cease. At 518, when the user interface fails to receive the user input within a predefined duration, the method comprises delivering, by the farther electronic device, another alarm to the environment of the farther electronic device.

At 519, the delivering the another alarm of 518 to the environment is more audible than the delivering the alarm to the environment. At 520, the closer electronic device of 518 comprises a wearable electronic device and the farther electronic device comprises a smartphone.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, the electronic device can be a smartphone equipped with a user interface and a communication device that interacts with companion devices such as smartwatches, tablets, or IoT devices within the environment. The processors in the smartphone are configured to detect an alarm event and determine which device is closest to the user. Upon detection, the smartphone can deliver an alarm through the user interface. If the user does not respond, the processors can trigger an alarm on a companion device, such as a smartwatch, which may be worn by the user, ensuring proximity and immediate attention.

In another embodiment, the system can prioritize devices based on their audio capabilities, starting with the device that produces the softest sound and escalating to louder devices if the user remains unresponsive. This adaptability allows the system to cater to different user preferences and environments, ensuring effective alarm management. Additionally, the system can be configured to operate in a daisy-chain mode, where alarms are sequentially activated on multiple devices, or in a simultaneous mode, where alarms are triggered on several devices at once, enhancing the likelihood of user engagement. These embodiments demonstrate the system's flexibility in utilizing various connected devices to manage alarms effectively.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, comprising:
detecting, with a communication device of the electronic device, at least one companion electronic device operating within an environment of the electronic device;
determining, with one or more processors of the electronic device, a location of both the electronic device and of the at least one companion electronic device relative to an authorized user of the electronic device situated within the environment;
causing, by the one or more processors, actuation of an alarm carried by a device closest to the authorized user within the environment selected from the device closest to the authorized user is the electronic device and the at least one companion electronic device;
detecting, by the one or more processors, whether user input in response to the actuation of the alarm is received by the electronic device or the at least one companion electronic device; and
when the one or more processors fail to detect the user input, causing actuation of another alarm carried by a next closest device to the authorized user selected from the electronic device and the at least one companion electronic device.

2. The method of claim 1, further comprising, when the one or more processors fail to detect the user input, causing the actuation of the alarm carried by the device closest to the authorized user simultaneously with the actuation of the another alarm carried by the next closest device to the authorized user.

3. The method of claim 1, wherein:
the at least one companion electronic device comprises at least a first companion electronic device and a second companion electronic device;
one of the electronic device or the first companion electronic device is the device closest to the authorized user within the environment; and
another of the electronic device or the first companion electronic device is next closest device to the authorized user within the environment.

4. The method of claim 3, further comprising:
detecting, by the one or more processors, whether other user input in response to the actuation of the another alarm is received by the electronic device or the first companion electronic device in response to the actuation of the another alarm; and
when the one or more processors fail to detect the other user input, causing actuation of an additional alarm carried by the second companion electronic device.

5. The method of claim 4, wherein the one or more processors cause the alarm, the another alarm, and the additional alarm to actuate simultaneously when the one or more processors fail to detect the other user input.

6. The method of claim 4, wherein the electronic device comprises a smartphone.

7. The method of claim 6, wherein the first companion electronic device comprises a wearable electronic device.

8. The method of claim 7, wherein the second companion electronic device comprises an Internet of Things (IoT) device.

9. The method of claim 1, wherein the one or more processors cause actuation of the another alarm carried by the next closest device to the authorized user only when a daisy-chain mode of operation has been enabled.

10. The method of claim 1, wherein the one or more processors cause actuation of the another alarm carried by the next closest device to the authorized user only when failing to detect the user input for at least a predefined duration.

11. An electronic device, comprising:
a user interface;
a communication device in communication with at least one companion electronic device situated within an environment of the electronic device; and
one or more processors operable with the user interface and the communication device;
wherein in response to detection of an alarm event, the one or more processors cause one of the user interface or the at least one companion electronic device to deliver an alarm to the environment and, in response to the user interface or at least one other user interface of the at least one companion electronic device failing to receive user input causing the alarm to cease, cause another of the user interface or the at least one companion electronic device to deliver another alarm to the environment;
wherein the one or more processors select which of the user interface or the at least one companion electronic device deliver the alarm to the environment by determining which of the electronic device or the companion electronic device is closer to an authorized user situated within the environment.

12. The electronic device of claim 11, wherein the one or more processors determine which of the electronic device or the companion electronic device is closer to an authorized user situated within the environment using one or more of measuring Bluetooth signal strength received from the electronic device and the companion electronic device, measuring a received signal strength indicator associated with the electronic device and the companion electronic device, Wi-Fi triangulation, and or measuring time of flight radio waves.

13. The electronic device of claim 11, wherein the one or more processors cause the one of the user interface or the at least one companion electronic device to deliver the alarm to the environment simultaneously with the another of the user interface or the at least one companion electronic device when the another of the user interface or the at least one companion electronic device delivers the another alarm to the environment.

14. The electronic device of claim 11, wherein the alarm and the another alarm are both audio alarms and the another alarm is louder than the alarm.

15. The electronic device of claim 11, wherein the one or more processors further select which of the user interface or the at least one companion electronic device deliver the alarm to the environment by determining which of the electronic device or the companion electronic device is louder.

16. The electronic device of claim 11, wherein the one or more processors further select which of the user interface or the at least one companion electronic device deliver the alarm to the environment by determining which of the electronic device or the companion electronic device is more frequently deactivated by an authorized user when delivering alarm signals to the environment.

17. The electronic device of claim 16, wherein the one of the user interface or the at least one companion electronic device caused to deliver the alarm to the environment is less frequently deactivated when delivering alarm signals to the environment that the another of the user interface or the at least one companion electronic device caused to deliver the another alarm to the environment.

18. A method in an electronic device, the method comprising:

determining, by one or more sensors of the electronic device, whether the electronic device or at least one companion electronic device is a closer electronic device to an authorized user of the electronic device and the companion electronic device and which of the electronic device or the at least one companion electronic device is a farther electronic device from the authorized user of the electronic device and the companion electronic device;

in response to an alarm event occurring, delivering, by the closer electronic device, an alarm to an environment of the closer electronic device;

waiting, by a user interface of the closer electronic device, for user input causing the alarm to cease; and when the user interface fails to receive the user input within a predefined duration, delivering, by the farther electronic device, another alarm to the environment of the farther electronic device.

19. The method of claim 18, wherein the delivering the another alarm to the environment is more audible than the delivering the alarm to the environment.

20. The method of claim 18, wherein the closer electronic device comprises a wearable electronic device and the farther electronic device comprises a smartphone.

* * * * *